United States Patent
Ota

(10) Patent No.: US 7,670,408 B2
(45) Date of Patent: Mar. 2, 2010

(54) METHOD OF SEPARATING NITROGEN GAS AND MOLECULAR SIEVE CARBON

(75) Inventor: Yukihito Ota, Bizen (JP)

(73) Assignee: Kuraray Chemical Co., Ltd., Bizen-shi (JP)

( * ) Notice: Subject to any disclaimer, the term of this patent is extended or adjusted under 35 U.S.C. 154(b) by 546 days.

(21) Appl. No.: 11/574,251

(22) PCT Filed: Aug. 9, 2005

(86) PCT No.: PCT/JP2005/014583

§ 371 (c)(1),
(2), (4) Date: Feb. 26, 2007

(87) PCT Pub. No.: WO2006/025198

PCT Pub. Date: Mar. 9, 2006

(65) Prior Publication Data

US 2007/0261550 A1    Nov. 15, 2007

(30) Foreign Application Priority Data

Aug. 30, 2004  (JP) ............................. 2004-250485

(51) Int. Cl.
*B01D 53/02* (2006.01)
(52) U.S. Cl. ................................ 95/96; 95/130; 96/130
(58) Field of Classification Search ............... 95/96, 95/130; 96/130
See application file for complete search history.

(56) References Cited

U.S. PATENT DOCUMENTS 4,742,040 A * 5/1988 Ohsaki et al. ............... 502/426

FOREIGN PATENT DOCUMENTS

| JP | 52-18675 | 5/1977 |
|---|---|---|
| JP | 61-8004 | 3/1986 |
| JP | 5-66886 | 9/1993 |
| JP | 07-155589 | 6/1995 |
| JP | 2619839 | 3/1997 |
| JP | 2623487 | 4/1997 |
| JP | 2001-342013 | 12/2001 |
| JP | 2002-159820 | 6/2002 |
| JP | 2003-104720 | 4/2003 |
| WO | 02/098555 | 12/2002 |

* cited by examiner

*Primary Examiner*—Robert A Hopkins
(74) *Attorney, Agent, or Firm*—Oblon, Spivak, McClelland, Maier & Neustadt, L.L.P.

(57) ABSTRACT

It is an object of the present invention to provide an industrially viable PSA process that requires small volumes of molecular sieve carbon and feed air. In order to achieve the above object, the PSA process uses the molecular sieve carbon satisfying the following relationships (I) and (II).

(1) $\ln C \leq 0.325 + 5.14 \times \ln\{(0.64+0.098) \times Q/(P+0.098)\}$  (I)

(2) $\ln U \leq 2.124 - 0.135 \times \ln C$  (II)

where C indicates an oxygen level (ppm) in the nitrogen gas product; Q indicates a volume of nitrogen gas produced per minute per unit effective volume of a single adsorption column; P indicates an adsorption pressure (MPa); and U indicates a ratio of the volume of the feed air to the volume of the nitrogen gas produced.

8 Claims, 1 Drawing Sheet

METHOD OF SEPARATING NITROGEN GAS AND MOLECULAR SIEVE CARBON

TECHNICAL FIELD

The present invention relates to a process for separating nitrogen gas and to a molecular sieve carbon for use in such a process. More specifically, the present invention relates to a process for separating nitrogen and to a molecular sieve carbon for use in such a process, wherein a feed gas made up mainly of nitrogen is fed under pressure to one of at least two adsorption columns packed with molecular sieve carbon to conduct high pressure adsorption, the one of at least two adsorption columns having completed high pressure adsorption is subjected to low pressure desorption, and the alternating cycle of the high pressure adsorption and the low pressure desorption are repeated in each adsorption column to separate nitrogen gas product, wherein the molecular sieve carbon has 0.7 wt % or less ignition residue and the following relationships (I) and (II) are satisfied:

(1) $\ln C \leq 0.325 + 5.14 \times \ln\{(0.64 + 0.098) \times Q/(P + 0.098)\}$      (I)

(2) $\ln U \leq 2.124 - 0.135 \times \ln C$      (II)

where C indicates an oxygen level (ppm) in the nitrogen gas product; Q indicates a volume of nitrogen gas produced per minute per unit effective volume of a single adsorption column; P indicates an adsorption pressure (MPa); and U indicates a ratio of the volume of the feed air to the volume of the nitrogen gas produced.

BACKGROUND ART

Nitrogen gas has been increasingly used in many fields, including treatment of metals, production of semiconductors and a sealing gas in chemical industry. Pressure swing adsorption (referred to as "PSA", hereinafter) is one of the most commonly used techniques in the production of nitrogen gas. In many cases, the technique is used to separate nitrogen from pressurized air and involves the use of porous carbon materials such as molecular sieve carbon. When the feed gas is air, two or more adsorption columns packed with molecular sieve carbon are generally used. The air is fed under pressure to one of the columns to cause oxygen to be adsorbed onto the molecular sieve, letting the unadsorbed nitrogen flow out of the column for collection. Meanwhile the pressure in the other column is reduced to cause the adsorbed oxygen to be desorbed. The adsorption and desorption of oxygen are alternated in the multiple columns. In this manner, nitrogen can be continuously collected by taking advantage of the difference in the adsorption rate between oxygen and nitrogen.

Referring to FIG. 1, a conventional PSA process is described wherein this process uses two adsorption columns to remove oxygen from air or other gas mixtures composed mainly of nitrogen, thus giving nitrogen as a gas product and regeneration of an adsorbent under normal pressure. In an adsorption step in a adsorption column 4, a feed gas such as air, is introduced via a feed gas inlet line 1 into a compressor 2 where it is compressed; and the compressed air is passed through a cooler 3 into the adsorption column 4. Each adsorption column is packed with molecular sieve carbon to serve as the adsorbent. In the adsorption column, oxygen in the feed gas is preferentially adsorbed onto the adsorbent and removed from the feed gas, allowing the remaining nitrogen to flow through to a product reservoir 6, from which the nitrogen is collected via a gas product line 16.

When one of the adsorption columns is operated in the adsorption step, the other is operated in the desorption step and is open to the atmosphere. Specifically, valves 7, 10 and 12 are opened and valves 8, 9, 11, 13 and 14 are closed when the adsorption column 4 is operated in the adsorption step. Part of the gas that flows out of the adsorption column 4 flows through an orifice 15 into the other column operating in the desorption step and purges the column.

After a predetermined period of time, the valves 7, 10 and 12 are closed. In the next pressure equalization step, the valves 11 and 14 are opened to release the residual pressure inside the adsorption column 4 into the adsorption column 5. Subsequently, the valves 8, 9 and 13 are opened and the valves 7, 10, 11, 12 and 14 are closed, so that the adsorption column 5 switches to adsorption step and the adsorption column 4 switches to desorption step. Once the adsorption in the adsorption column 5 comes to an end, the valves 8, 9 and 13 are closed and the valves 11 and 14 are opened to release the residual pressure inside the adsorption column 5 into the adsorption column 4, thereby equalizing the pressure in the system. This sequence operations are repeated cyclically to produce nitrogen product.

These valves are automatically opened or closed at the timings set by a timer, so that the nitrogen product is stored in the product reservoir 6 from which it is drawn out through the product gas outlet line 15 and is consumed. The gas (oxygen) adsorbed onto the molecular sieve carbon is desorbed as the pressure in the columns is reduced: once the valve 9 or 10 is opened, the adsorbed gas is released from the molecular sieve carbon and is discharged from the discharge line 17.

There are two ways to make PSA an industrially more advantageous process: to improve the separation performance of molecular sieve carbon or to improve the efficiency of PSA system. Of many PSA processes that have been proposed thus far few have taken into account both of these two approaches. In one process for making improved molecular sieve carbon, a hydrocarbon such as toluene is added to coke and the coke is processed at a high temperature. This causes carbon to be deposited within the pores of coke and as a result, the size of the pores is optimized. This improved molecular sieve is used to remove oxygen from the air to produce nitrogen gas (Patent Document 1).

Patent Document 1. Japanese Examined Patent Publication No. Sho 52-18675).

In another process, coconut shell carbon powder is granulated using a coal tar pitch binder and is carbonized. The granules are washed with hydrochloric acid, and impregnated with coal tar pitch. The carbonized carbon is then heated to make a molecular sieve carbon. This molecular sieve carbon is used to produce nitrogen gas from the air (Patent Document 2).

Patent Document 2: Japanese Examined Patent Publication No Sho 61-8004

In still another process, coconut shell carbon powder is similarly formed into granules using a coal tar pitch binder. The granules are washed with hydrochloric acid, and impregnated with creosote oil. The carbonized carbon is then heated to make a molecular sieve carbon. This molecular sieve carbon is used to produce nitrogen gas from the air (Patent Document 3).

Patent Document 3: Japanese Examined Patent Publication No. Hei 5-66886

On the other hand, some PSA processes focus on improving the efficiency of the process by modifying the design of the system. One such system uses a molecular sieve carbon with specifically defined performance and is designed such that the time at which the exhaustion valve is opened during the regeneration step under atmospheric pressure and the time at which the nitrogen gas product is passed through the adsorption columns are controlled to satisfy a predetermined relationship. The performance of the molecular sieve carbon is defined by determining the ability of the molecular sieve to adsorb oxygen or nitrogen. Specifically, this is done by leaving the molecular sieve in the presence of each gas alone under pressure for 1 minute and determining the ratio of the volumes of oxygen and nitrogen adsorbed by the molecular sieve (Patent Document No. 4).

Patent Document 4: Japanese Patent No. 2619839

Another such system uses a molecular sieve carbon with its performance defined by determining its ability to adsorb oxygen or nitrogen. Likewise, the performance is determined by leaving the molecular sieve in the presence of oxygen or nitrogen alone under pressure for 1 minute and determining the ratio of the volumes of oxygen and nitrogen adsorbed by the molecular sieve. In this system the product nitrogen gas amount taken out and the effective volume of the product storage tank are controlled so as to be correlated to the effective volume per one adsorbing tower, and the time required for the adsorption step is specified (Patent Document 5)

Patent Document 5 Japanese Patent No. 2623487

These improved PSA systems may be used in conjunction with any of the modified molecular sieve carbons to make the PSA process even more suitable for industrial applications. To this ends it is necessary to design small PSA systems that require minimum amounts of molecular sieve carbon and feed air.

Recently, a PSA system in which the pressure rise rate at the pressurizing step and the time at the pressure-equalizing step are controlled is developed. This facilitates effective generation of highly pure nitrogen gas (Patent Document 6). Another PSA system achieves improved separation performance by using a cylindrical molecular sieve carbon that is 0.5 to 1.5 mm in height (Patent Document No. 7).

Patent Document 6: Japanese Patent Application Laid-Open No. 2001-342013

Patent Document 7: Japanese Patent Application Laid-Open No. 2003-104720

DISCLOSURE OF THE INVENTION

The PSA systems described in Patent Documents 6 and 7 each enable effective separation of nitrogen gas and are each a relatively advanced system. However the PSA system of Patent Document 6 has a drawback in that it still requires a substantial volume of molecular sieve carbon though the volume of air used has been sufficiently reduced. The PSA system of Patent Document 7 on the other hand has a problem that, despite the large volume of nitrogen produced by each molecular sieve carbon the air consumption by the system is significantly large, making the system industrially unattractive.

Thus, no PSA systems have ever been developed that meet the two essential requirements for an industrially viable PSA process: small volume of molecular sieve carbon and small volume of feed air. It is therefore an object of the present invention to provide an industrially viable PSA process that requires small volumes of molecular sieve carbon and feed air.

Means to Solve the Problems

To achieve the above-mentioned objective, the present inventor have closely examined previously reported PSA processes and have discovered that for the development of industrially viable PSA processes it is necessary to use a molecular sieve carbon that has 0.7 wt % or less ignition residue. The present inventor have also discovered that the oxygen level in the nitrogen gas product, the volume of the nitrogen gas produced per minute per unit effective volume of a single adsorption column, and the adsorption pressure are closely related to one another, as are the ratio of the volume of the feed air to the volume of the nitrogen gas product and the oxygen level in the nitrogen gas product: These quantities must satisfy a particular relationship. These findings ultimately led to the present invention.

Accordingly, the present invention in one aspect provides a process for separating nitrogen, wherein a feed gas made up mainly of nitrogen is fed under pressure to one of at least two adsorption columns packed with molecular sieve carbon to conduct high pressure adsorption the one of at least two adsorption columns having completed high pressure adsorption is subjected to low pressure desorption, and the alternating cycle of the high pressure adsorption and the low pressure desorption are repeated in each adsorption column to separate nitrogen gas product, wherein the molecular sieve carbon has 0.7 wt % or less ignition residue and the following relationships (I) and III) are satisfied:

(1)ln $C \leq 0.325+5.14 \times \ln\{(0.64+0.098) \times Q/(P+0.098)\}$ (I)

(2)ln $U \leq 2.124 - 0.135 \times \ln C$ (II)

where C indicates an oxygen level (ppm) in the nitrogen gas product; Q indicates a volume of nitrogen gas produced per minute per unit effective volume of a single adsorption column; P indicates an adsorption pressure (MPa); and U indicates a ratio of the volume of the feed air to the volume of the nitrogen gas produced.

In another aspect, the present invention provides a molecular sieve carbon with a ignition residue of 0.7% or less, wherein; when a feed gas made up mainly of nitrogen is fed under pressure to one of at least two adsorption columns packed with the molecular sieve carbon to conduct high pressure adsorption, the one of at least two adsorption columns having completed high pressure adsorption is subjected to low pressure desorption, and the alternating cycle of the high pressure adsorption and the low pressure desorption are repeated in each adsorption column to separate nitrogen gas; the molecular sieve carbon satisfies the following relationships (I') and (II'):

(1)ln $C \leq 0.325+5.14 \times \ln\{(0.64+0.098) \times Q/(P+0.98)\}$ (I')

(2)ln $U \leq 2.124 - 0.135 \times \ln C$ (II')

where C indicates an oxygen level (ppm) in the nitrogen gas product; Q indicates a volume of nitrogen gas produced per minute per unit effective volume of a single adsorption column; P indicates an adsorption pressure (MPa); and U indicates a ratio of the volume of the feed air to the volume of the nitrogen gas produced.

ADVANTAGES OF THE INVENTION

According to the present invention, there is provided an industrially viable PSA process that requires small volumes of molecular sieve carbon and feed air. The PSA process of the present invention can produce highly pure nitrogen with decreased volumes of molecular sieve carbon and feed air and thus serves as a cost effective PSA technique.

BEST MODE FOR CARRYING OUT THE INVENTION

The most significant feature of the process of the present invention for separating nitrogen gas is the use of the molecular sieve carbon that has 0.7 wt % or less ignition residue and satisfies the following relationships (I) and (II):

(1) $\ln C \leq 0.325 + 5.14 \times \ln\{(0.64+0.098) \times Q/(P+0.098)\}$ (I)

(2) $\ln U \leq 2.124 - 0.135 \times \ln C$ (II)

where C indicates the oxygen level (ppm) in the nitrogen gas product; Q indicates the volume of nitrogen gas produced per minute per unit effective volume of a single adsorption column; P indicates the adsorption pressure (MPa); and U indicates the ratio of the volume of the feed air to the volume of the nitrogen gas produced.

It is more preferred that lnC satisfies the following relationship (III):

$\ln C \leq 0.0958 + 5.25 \times \ln\{(0.64+0.098) \times Q/(P+0.098)\}$ (III).

The molecular sieve carbon used to pack the adsorption columns in the process for separating nitrogen gas of the present invention has superfine pores sized 3 to 5 angstroms. Such molecular sieve carbons are produced by charring charcoal, coal, coke, coconut shell, resin, pitch or other materials having uniformly sized fine pores to make plant-based, coal-based, resin-based or pitch-based carbon material, decalcifying the carbon material, and adjusting the pore size of the decalcified carbon material. Plant-based carbon materials are particularly preferred for ease of decalcification. Of different plant-based carbon materials, coconut shell is particularly preferred.

Plant-based carbon materials such as coconut shell generally contain 2.0 wt % or more ash. In order to use coconut shell or other plant-based carbon materials in the present invention, their ash content must be reduced to 0.1 wt % or less. Though the ash content of these materials may be reduced by any suitable technique, it is preferred to repeatedly wash them with hydrochloric acid. The term "0.7 wt % or less ash" as used herein means the amount of ash remaining in the molecular sieve carbon after pore size adjustment of the carbon materials that are materials of active carbon. Once the ash content has been reduced to 1.7 wt % or less, the pore size is adjusted to obtain molecular sieve carbon suitable for use in the present invention.

The adsorption time is typically set to the range of 20 sec to 120 sec. and more preferably over the range of 40 sec to 70 sec. Although the shape of the molecular sieve carbon may not be restricted, spheres or cylinders (pellets) that are 0.4 to 1.5 mm in outer diameter (D) are practically preferred. When the molecular sieve carbon is formed as cylinder, it is typically formed such that the ratio of the length of the cylinder (L) to the outer diameter (D) thereof is from about 2 to about 5.

The molecular sieve carbon for use in the process of the present invention may be prepared in the following manner: Coconut shell carbon powder is granulated using a coal tar pitch binder and is carbonized. The granules are carbonized at 600° C. to 900° C. and washed repeatedly with a mineral acid such as hydrochloric acid. The granules are then washed with water, dried, and impregnated with a pore treatment such as creosote oil. The impregnated granules are then heated at 600° C. to 900° C. and are cooled in an inert gas to make the desired molecular sieve carbon. In this fashion, the ash content of the molecular sieve carbon can be reduced to 0.7 wt % or less and the pore size can be adjusted as desired.

The molecular sieve carbon so obtained can be used in the PSA process to produce nitrogen from the air in an industrially favorable manner. Though the underlying mechanism is not fully understood, it is believed that decalcifying the carbon material to reduce the ignition residue to 0.7 wt % or less increases the pore volume, thus increasing the volume of oxygen adsorption. The decalcification also decreases the impurity during the pore adjustment and thereby facilitates the formation of pores suitable for the separation of nitrogen from the air. The present invention will now be described in further detail with reference to Examples, which are not intended to limit the scope of the invention in any way.

Production of Molecular Sieve Carbon A:

40 parts by weight of coal tar and 8 parts by weight of water were added to 100 parts by weight of fine crushed coconut shell carbon and the mixture was thoroughly mixed and kneaded. The mixture was pressed in a hydraulic press and was extruded from a 0.8 mm nozzle to form cylindrical granules. The resulting cylindrical granules were heated at 600° C. for 30 ml in a fluid-type pyrolysis furnace and were then cooled in nitrogen.

The granules were thoroughly immersed in 0.6N hydrochloric acid at 80° C. while the solution was stirred. Hydrochloric acid was then discarded. After washed three times with hydrochloric acid the granules were washed with water and dried to make purified carbon, which in turn was heated at 900° C. in an external electric furnace and was cooled in nitrogen. 3 parts by weight of a 140 to 260° C. fraction of creosote oil were then added to the purified carbon. This mixture was placed in a rotary kiln in a weak stream of nitrogen gas and the temperature was increased from room temperature to 400° C. in 20 minutes to thoroughly impregnate with creosote oil. Subsequently, the temperature was further increased to 700° C. in 20 minutes for heat treatment. The granules were then allowed to cool to room temperature in nitrogen to give molecular sieve carbon.

Production of Molecular Sieve Carbon B:

A molecular sieve carbon was obtained in the same manner as molecular sieve carbon A, except that the granules were not washed with hydrochloric acid.

Production of Molecular Sieve Carbon C:

A molecular sieve carbon was obtained in the same manner as molecular sieve carbon A, except that the granules were washed once with hydrochloric acid at room temperature.

Production of Molecular Sieve Carbon D:

A molecular sieve carbon was obtained in the same manner as molecular sieve carbon A, except that a 1.6 mm nozzle was used.

Production of Molecular Sieve Carbon E:

A molecular sieve carbon was obtained in the same manner as molecular sieve carbon A, except that a 0.4 mm nozzle was used.

Production of Molecular Sieve Carbon F 40 parts by weight of coal tar and 8 parts by weight of water were added to 100 parts by weight of fine crushed coconut shell carbon and the mixture was thoroughly mixed and kneaded. The mixture was pressed in a hydraulic press and was extruded from a 0.6 mm nozzle to form pellets. With a high-speed mixer FS-G (Fukae Powtec) operated at 60° C., 400 rpm, the resulting cylindrical carbon granules were formed into spheres with an average particle size of 1.0 mm. The spheric carbon granules were heated at 600° C. for 30 min in a fluid-type pyrolysis furnace and were cooled in nitrogen. The rest of the procedure was performed as described in the production of molecular sieve carbon A to give molecular sieve carbon F. The molecular sieve carbons A through F were analyzed for the ash content as a measure of the ignition residue and the equilibrium oxygen adsorption. The results are shown in Table 1. In Table 1, "mL" denotes milliliter. The results indicate that a molecular sieve carbon with a smaller ignition residue tends to have a greater equilibrium oxygen adsorption.

TABLE 1

| Molecular sieve carbon | Ignition residue (wt %) | Equilibrium oxygen adsorption (mL/g) |
| --- | --- | --- |
| A | 0.48 | 7.9 |
| B | 1.89 | 4.7 |
| C | 0.80 | 7.2 |
| D | 0.51 | 7.8 |
| E | 0.47 | 8.0 |
| F | 0.50 | 7.9 |

Examples 1 through 10 and Comparative Examples 1 through 4

Using the system shown in FIG. 1, a PSA process was carried out for each of molecular sieve carbons A through F with each adsorption column packed with 3.0 L of a corresponding molecular sieve carbon. Each process was carried out using a corresponding pressure shown in Table 2. The results are shown in Table 2. In Table 2 "NL" denotes normal litter and indicates the volume of nitrogen gas under standard conditions

INDUSTRIAL APPLICABILITY

According to the present invention there is provided an industrially viable PSA process that requires small volumes of molecular sieve carbon and feed air. The PSA process of the present invention can produce highly pure nitrogen with decreased volumes of molecular sieve carbon and feed air. The process serves as a cost effective PSA technique and is thus of industrial importance.

Figure 1:
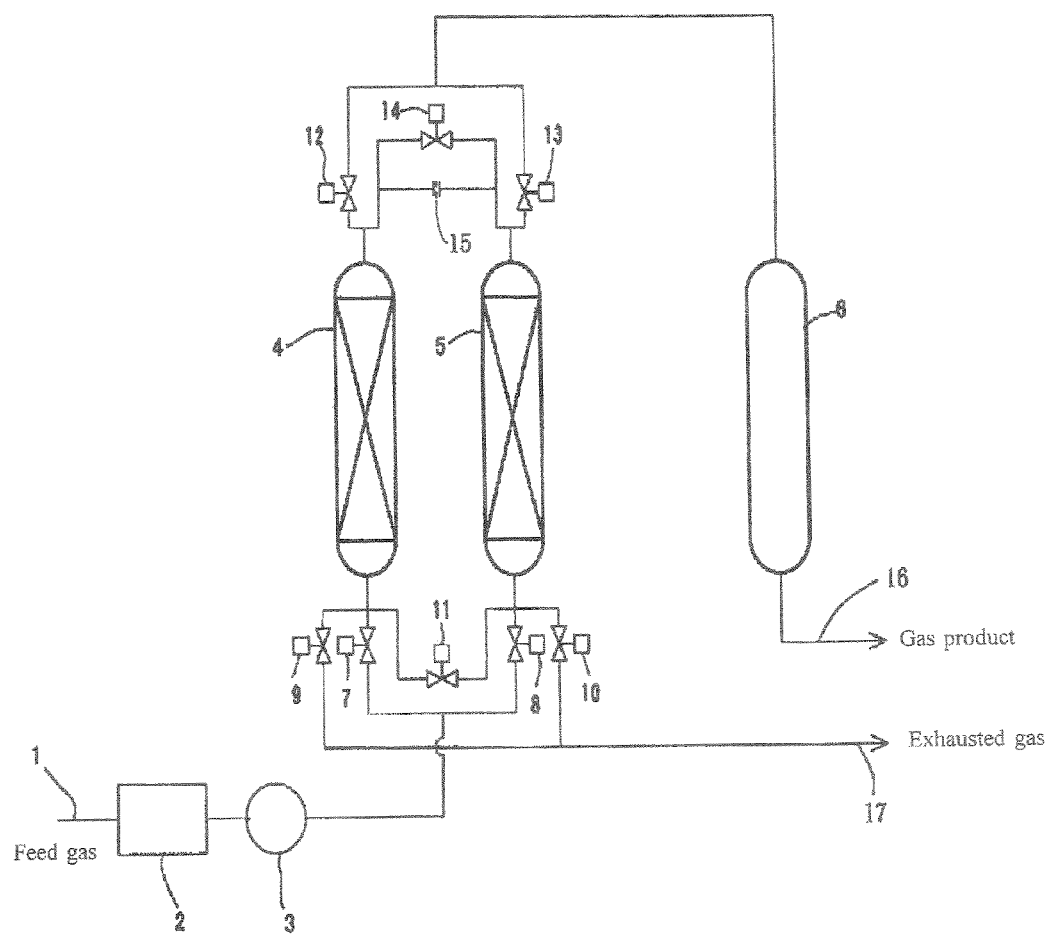
FIG. 1 is a diagram showing an exemplary PSA system.

EXPLANATION OF REFERENCE SYMBOLS 1 feed gas inlet line
2 compressor
3 cooler
4 adsorption column
5 adsorption column
6 product reservoir
7-14 valve
15 orifice
16 product nitrogen gas outlet line
17 discharge line

The invention claimed is:

1. A process for separating nitrogen, wherein a feed gas made up mainly of nitrogen is fed under pressure to one of at least two adsorption columns packed with molecular sieve carbon to conduct high pressure adsorption, the one of at least two adsorption columns having completed high pressure adsorption is subjected to low pressure desorption, and the alternating cycle of the high pressure adsorption and the low pressure desorption are repeated in each adsorption column to separate nitrogen gas product, wherein
the molecular sieve carbon has 0.7 wt % or less ignition residue and the following relationships (I) and (II) are satisfied:

$$(1) \ln C \leq 0.325 + 5.14 \times \ln\{(0.64 + 0.098) \times Q/(P + 0.098)\} \quad (I)$$

$$(2) \ln U \leq 2.124 - 0.135 \times \ln C \quad (II)$$

TABLE 2

| | Molecular sieve carbon | Pressure (MPa) | Oxygen level C(ppm) | Volume of produced nitrogen gas (NL/L/min) | Air unit (NL/NL) | lnC | | Right side of relationship (I) | lnU | | Right side of relationship (II) |
| --- | --- | --- | --- | --- | --- | --- | --- | --- | --- | --- | --- |
| Ex. 1 | A | 0.64 | 100 | 2.7 | 4.25 | 4.605 | < | 5.430 | 1.447 | < | 1.502 |
| Ex. 2 | A | 0.64 | 1000 | 4.1 | 3.10 | 6.908 | < | 7.577 | 1.131 | < | 1.191 |
| Ex. 3 | A | 0.79 | 100 | 3.2 | 4.30 | 4.605 | < | 5.353 | 1.459 | < | 1.502 |
| Ex. 4 | A | 0.79 | 1000 | 4.9 | 3.20 | 6.908 | < | 7.543 | 1.163 | < | 1.191 |
| Comp. Ex. 1 | B | 0.64 | 100 | 1.3 | 7.00 | 4.605 | > | 1.674 | 1.946 | > | 1.502 |
| Comp. Ex. 2 | B | 0.64 | 1000 | 2.4 | 4.10 | 6.908 | > | 4.825 | 1.411 | > | 1.191 |
| Comp. Ex. 3 | C | 0.64 | 100 | 2.1 | 4.80 | 4.605 | > | 4.139 | 1.569 | > | 1.502 |
| Comp. Ex. 4 | C | 0.64 | 1000 | 3.4 | 3.45 | 6.908 | > | 6.615 | 1.238 | > | 1.191 |
| Ex. 5 | D | 0.64 | 100 | 2.4 | 4.45 | 4.605 | < | 4.825 | 1.493 | < | 1.502 |
| Ex. 6 | D | 0.64 | 1000 | 3.7 | 3.25 | 6.908 | < | 7.050 | 1.179 | < | 1.191 |
| Ex. 7 | E | 0.64 | 100 | 3.0 | 4.00 | 4.605 | < | 5.972 | 1.386 | < | 1.502 |
| Ex. 8 | E | 0.64 | 1000 | 4.3 | 3.00 | 6.908 | < | 7.822 | 1.099 | < | 1.191 |
| Ex. 9 | F | 0.64 | 100 | 2.6 | 4.30 | 4.605 | < | 5.236 | 1.459 | < | 1.502 |
| Ex. 10 | F | 0.64 | 1000 | 3.9 | 3.15 | 6.908 | < | 7.320 | 1.147 | < | 1.191 | where C indicates an oxygen level (ppm) in the nitrogen gas product; Q indicates a volume of nitrogen gas produced per minute per unit effective volume of a single adsorption column; P indicates an adsorption pressure (MPa); and U indicates a ratio of the volume of the feed air to the volume of the nitrogen gas produced.

2. The process for separating nitrogen according to claim 1, wherein the molecular sieve carbon is made of a plant-based carbon material.

3. The process for separating nitrogen according to claim 2, wherein the plant-based carbon material is coconut shell.

4. The process for separating nitrogen according to any one of claims 1 to 3, wherein the molecular sieve carbon is spherical or cylindrical.

5. The process for separating nitrogen according to any one of claims 1 to 4, wherein the molecular sieve carbon has an outer diameter of 0.4 to 1.5 mm.

6. A molecular sieve carbon with a ignition residue of 0.7% or less, wherein; when a feed gas made up mainly of nitrogen is fed under pressure to one of at least two adsorption columns packed with the molecular sieve carbon to conduct high pressure adsorption the one of at least two adsorption columns having completed high pressure adsorption is subjected to low pressure desorption and the alternating cycle of the high pressure adsorption and the low pressure desorption are repeated in each adsorption column to separate nitrogen gas; the molecular sieve carbon satisfies the following relationships (I') and (II')

(1) $\ln C \leq 0.325 + 5.14 \times \ln\{(0.64+0.098) \times Q/(P+0.98)\}$ (I')

(2) $\ln U \leq 2.124 - 0.135 \times \ln C$ (II')

where C indicates an oxygen level (ppm) in the nitrogen gas product; Q indicates a volume of nitrogen gas produced per minute per unit effective volume of a single adsorption column; P indicates an adsorption pressure (MPa); and U indicates a ratio of the volume of the feed air to the volume of the nitrogen gas produced.

7. The molecular sieve carbon according to claim 6, being made of a plant-based carbon material that is decalcified prior to pore adjustment.

8. The molecular sieve carbon according to claim 7, wherein the plant-based carbon material is coconut shell.

* * * * *